United States Patent
Chen et al.

(10) Patent No.: US 7,992,214 B2
(45) Date of Patent: Aug. 2, 2011

(54) METHOD FOR PROTECTING MEMORY PROPRIETARY COMMANDS

(75) Inventors: Bei-Chuan Chen, Hsinchu (TW); Li-Hsiang Chan, Hsinchu (TW); Che-Wei Chang, Hsinchu (TW)

(73) Assignee: Moai Electronics Corporation, Hsinchu (TW)

( * ) Notice: Subject to any disclaimer, the term of this patent is extended or adjusted under 35 U.S.C. 154(b) by 438 days.

(21) Appl. No.: 12/266,554

(22) Filed: Nov. 7, 2008

(65) Prior Publication Data
US 2010/0122014 A1    May 13, 2010

(51) Int. Cl.
*G06F 7/04* (2006.01)
*G06F 12/14* (2006.01)
(52) U.S. Cl. .......... 726/30; 711/103; 711/115; 713/176
(58) Field of Classification Search .................. None
See application file for complete search history.

(56) References Cited

U.S. PATENT DOCUMENTS
7,865,659 B2 * 1/2011 Ramesh et al. ............... 711/103
2009/0182919 A1 * 7/2009 Chang et al. .................. 710/106
* cited by examiner

*Primary Examiner* — Gary Portka

(57) ABSTRACT

A method for protecting memory proprietary command is provided. By using the logic block area (LBA) address in the header of the LBA mode, the device end can determine whether the data sector in the LBA mode includes a proprietary command. Also, by using the pre-defined computation function to establish a relation among the values stored in a plurality of characteristic point addresses and a specific point address so that he device end can determine whether a proprietary command is received. As the operating system will not filter out the proprietary command wrapped in this manner, the proprietary command can pass the operating system and be executed by the device end.

8 Claims, 4 Drawing Sheets

METHOD FOR PROTECTING MEMORY PROPRIETARY COMMANDS

FIELD OF THE INVENTION

The present invention generally relates to a method for protecting memory proprietary commands, and more specifically to a method using specific memory address to store proprietary commands so as to pass the filtering of operating system and activating the proprietary commands.

BACKGROUND OF THE INVENTION

As the information application rapidly developing, various types of data storage devices, such as flash memory stick or memory cards, are developed. The data storage devices based on flash memory is among the most popular. To enhance the capability and improve the characteristics of flash memory sticks or memory cards, such as reading product ID or accelerating data access, the application at the host end usually transmits commands for activating specific application or executable applications to the controller of the memory card in order to execute the commands or the executable applications.

The current operating system uses the logic block area (LBA) mode to access peripheral storage devices and the diverse applications are developed for the storage devices.

FIG. 1 shows a schematic view of a conventional LBA mode. As shown in FIG. 1, the host end, such as PC 10, includes an application program (AP) 12 to transmit LBA transmission unit 31 having a header 33 and data sector 35 through transmission interface 30 to storage device 20. Transmission interface 30 can be a USB interface. Storage device 20 includes a controller 22 and a memory 24. Header 33 of LBA transmission unit 31 includes an LBA address for designating the storage address for the data of data sector 35.

The commands used by the diverse applications include two types, proprietary commands and through commands. USB transmission protocol uses SCSI command subset for data access; therefore, the proprietary commands can use the reserve field so that the controller of the storage device can differentiate the proprietary commands from the normal data. On the other hand, through commands uses the characteristics of file system to generate a plurality of files of specific size in the protected area of the storage device so that these files will not be overwritten or deleted. Also, these files are used to edit own through commands for transmission to the storage device. Because the through command is also a part of the data, the operating system will not filter out, i.e., wrapping the through command in a data format.

However, a major drawback of the conventional technology is that the reserve field used by the proprietary commands is considered as an invasion condition by the operating system. Therefore, the non-standard commands are all filtered out and the applications cannot be developed.

Another drawback of the conventional technology is that the through commands can only be realized in known file systems, such as FAT16, FAT 32. The development time is also longer for the application using through commands because the application must develop appropriate file behavior for the file system so that the through command can be edited into the files.

Therefore, it is imperative to devise a method for protecting proprietary commands to meet the standard transmission regulation and to allow the data and specific proprietary commands will not be filtered out by the operating system to solve the drawbacks of the conventional technology.

SUMMARY OF THE INVENTION

The primary object of the present invention is to provide a method for protecting memory proprietary commands so that the operating system will treat the proprietary command as regular data and not filtering out the proprietary commands. The device end uses the characteristic locations and the blocks within the specific LBA range to distinguish the regular data and proprietary commands transmitted by the host end so as to execute data access correctly or execute proprietary commands.

Another object of the present invention is to provide a method for protecting memory proprietary commands including the host end designating specific point address and a plurality of characteristic point addresses in the data sector of the LBA transmission unit. A plurality of signature values is stored in the characteristic addresses, respectively. A computation function is used to compute a mark value from the signature values and store the mark value to the specific point address. The LBA transmission unit having the mark value and the signature values is transmitted in the LBA mode to pass the filtering of the operating system.

Yet another object of the present invention is to provide a method for protecting memory proprietary commands, including the device end extracting LBA address from the header of the LBA transmission unit. If the LBA address is outside of a pre-defined range, the proprietary command in the data sector is executed. If the LBA address is within the pre-defined range, the signature value in the data sector of the LBA transmission unit is extracted and computed to obtain a comparison value. The comparison value is compared against the mark value in the specific point address. If the comparison value is the same as the mark value, the proprietary command in the data sector is executed and the operation terminates; otherwise, the normal data storage is executed and the operation terminates.

With this, the method for protecting memory proprietary commands of the present invention can protect proprietary commands from being blocked by the operating system, and can be transmitted to the storage device, and the controller of the storage device will execute the proprietary command. In this manner, the drawbacks of the conventional technology are solved.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The method for protecting memory proprietary commands of the present invention includes two stages. The first stage is the host end generating LBA transmission unit and the second stage is the device end executing the proprietary command. The host end can be personal computer (PC), notebook computer, PDA or other electronic devices with memory data access capability. The device end can be memory card, flash memory stick or other device with memory. The following will describe the first stage and the second stage operations in details.

Figure 1:
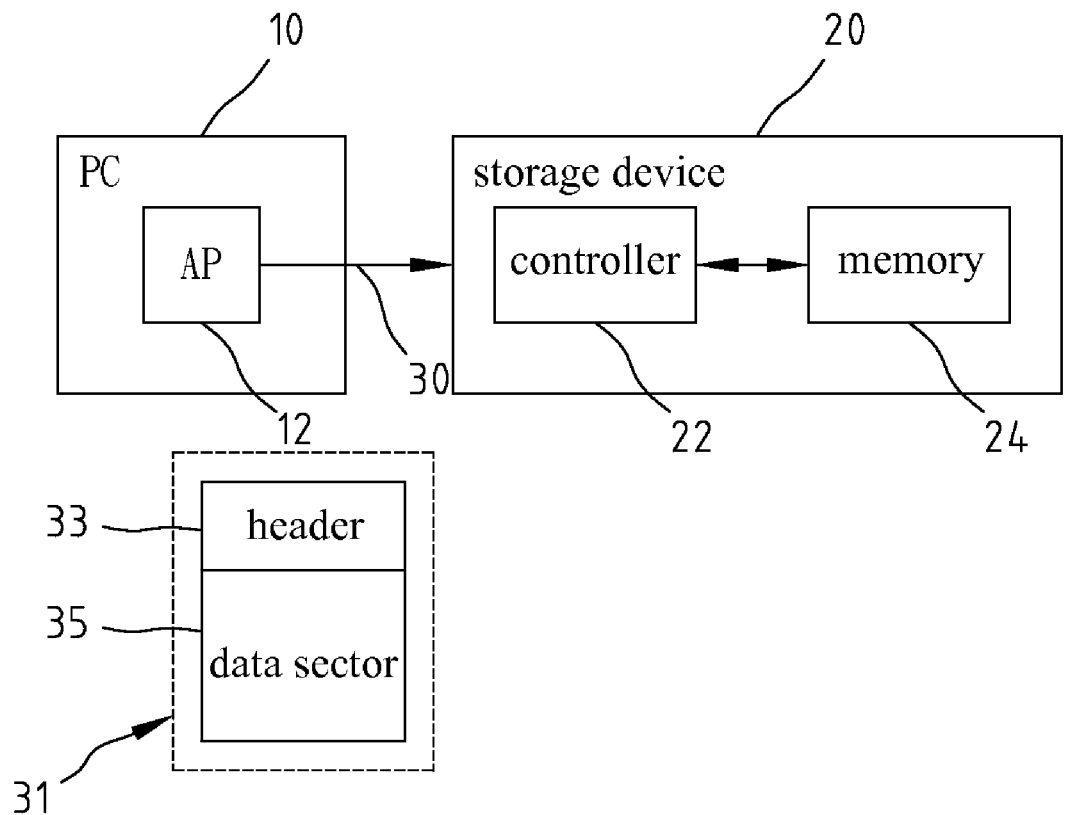
FIG. 1 shows a schematic view of LBA mode of conventional technology.
Figure 2:
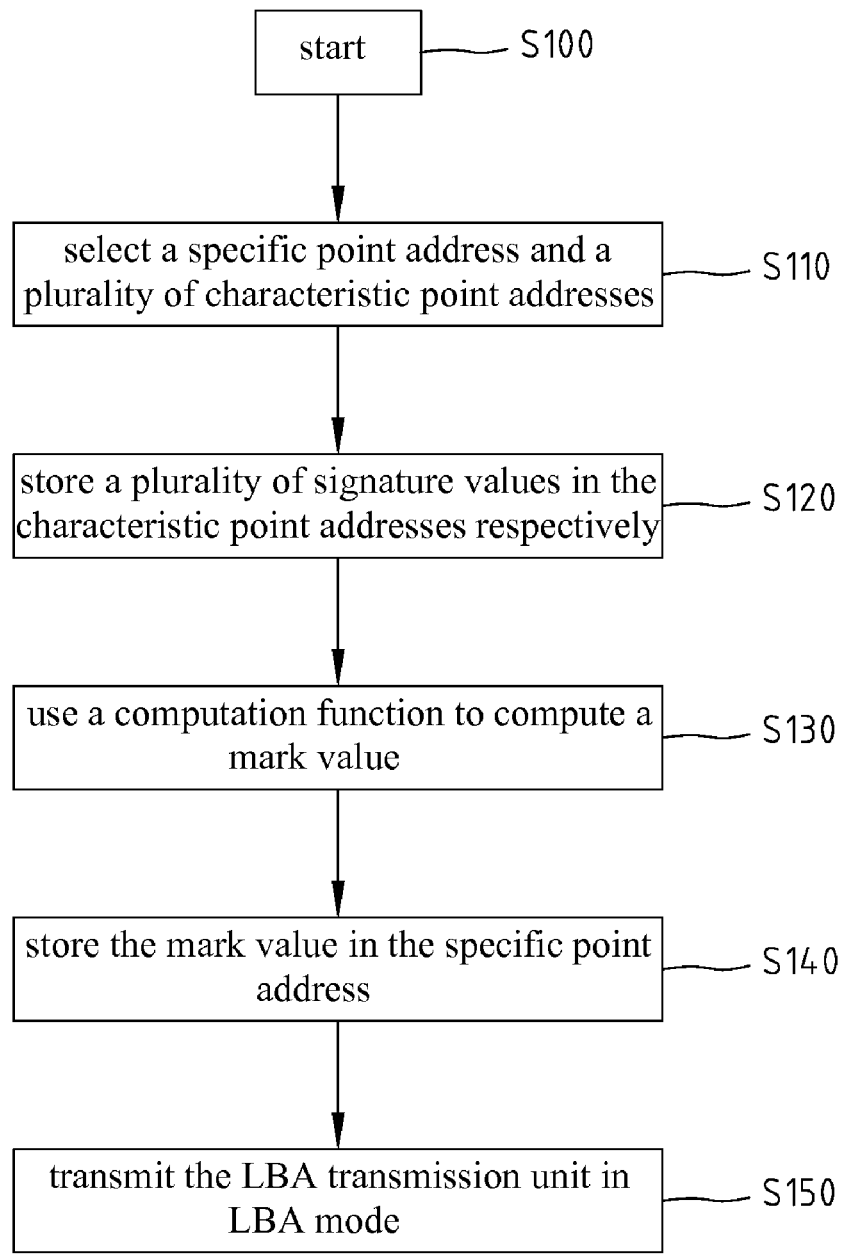
FIG. 2 shows a flowchart of the first stage operation of the method for protecting memory proprietary command according to the present invention.

FIG. 2 shows a flowchart of the first stage of the method for protecting memory proprietary command of the present invention. As shown in FIG. 2, the first stage operation starts with step S100 and enters step S110. Step S110 is for the host end to select a specific point address and a plurality of characteristic point addresses from the data sector of the LBA transmission unit and enter step S120. Step S120 is to select a plurality of signature values to be stored in the characteristic point addresses respectively, and enter step S130. Step S130 is to use a computation function to compute a mark value from the signature values and enter step S140. Step S140 is to store the mark value in the specific point address and enter step S150. Step 150 is to transmit the LBA transmission unit having the mark value and the signature values in LBA mode and terminate the operation of generating LBA transmission unit.

Figure 3:
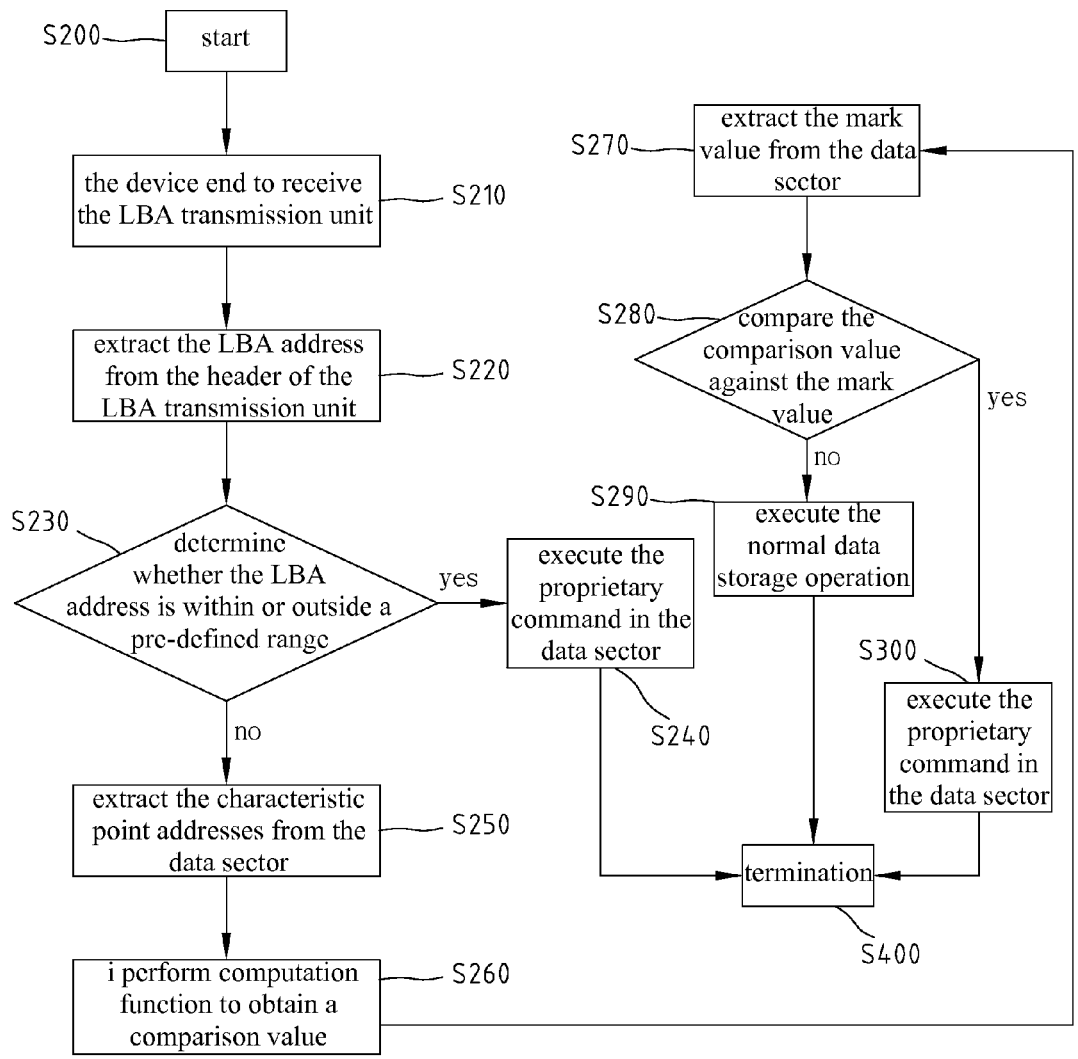
FIG. 3 shows a flowchart of the second stage operation of the method for protecting memory proprietary command according to the present invention.

FIG. 3 shows a flowchart of the second stage operation of the method for protecting memory proprietary commands of the present invention. As shown in FIG. 3, the operation starts with step S200 and enters step S210. Step S210 is for the controller of the device end to receive the LBA transmission unit and enter step S220. Step S220 is to extract the LBA address from the header of the LBA transmission unit and enter step S230. Step S230 is to determine whether the LBA address is within or outside a pre-defined range. If outside of the pre-define range, the operation takes step S240; otherwise, the operation takes step S250. Step S240 is to execute the proprietary command in the data sector and enter step S400. Step 250 is to extract the characteristic point addresses from the data sector of the LBA transmission unit and enter step S260. Step S260 is to perform computation function on the signature values to obtain a comparison value and enter step S270. Step S270 is to extract the mark value from the specific point address of the data sector and enter step S280. Step S280 is to compare the comparison value against the mark value. If the comparison value is different from the mark value, the operation enters step S290; otherwise, the operation enters step S300. Step S290 is to execute the normal data storage operation and enter step S400. Step S300 is to execute the proprietary command in the data sector and enter step S400. Step S400 is to terminate the second stage operation.

The pre-defined range in step S230 is greater than zero and less than or equal to the total sector number (TSN) of the data sectors. The following uses an exemplary embodiment with four characteristic point addresses to explain the method of the present invention.

Figure 4:
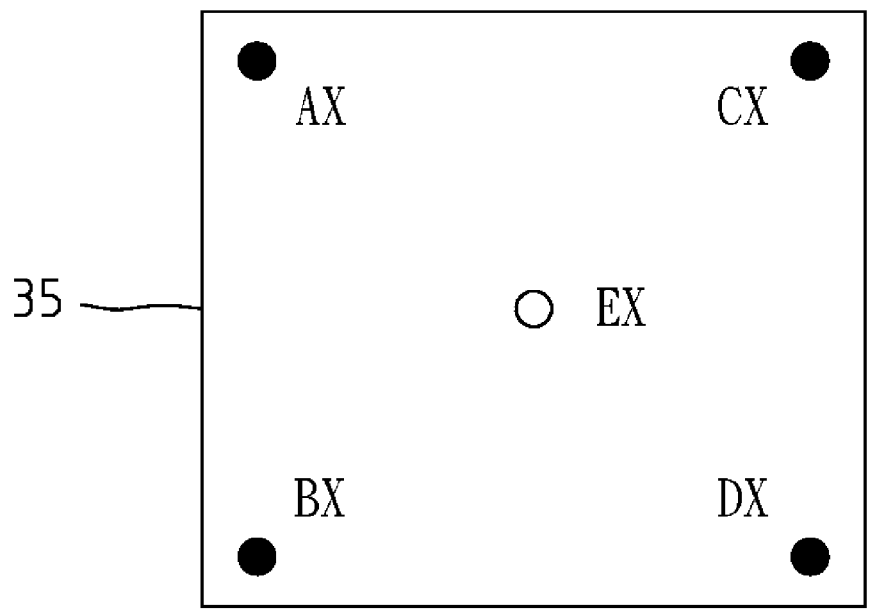
FIG. 4 shows a schematic view of the data sector of the method for protecting memory proprietary command according to the present invention.

FIG. 4 shows a schematic view of the data sector of the method for protecting memory proprietary commands according to the present invention. As shown in FIG. 4, four characteristic point addresses AX, BX, CX, and DX and a specific point address EX are selected in data sector 35 of LBA transmission unit, where characteristic point addresses AX, BX, CX, DX stores signature value A, B, C, D, respectively. Computation function f is performed on signature values A, B, C, D to obtain mark value E; i.e., E=f(A,B,C,D). Mark value E is stored in specific point address EX. Therefore, data sector 35 generated by host end includes characteristic point addresses AX, BX, CX, DX storing signature values A, B, C, D, respectively and specific point address EX storing mark value E. Computation function f can be accumulative addition; i.e., f(A,B,C,D)=A+B+C+D, and the proprietary command can be stored in any other address excluding characteristic point addresses AB, BX, CX, DX and specific point address EX.

The device end extracts the data stored in characteristic appoint addresses AX, BX, CX, DX, and computes a comparison value by computation function, i.e., f(A,B,C,D). Mark value E is also extracted from specific point address EX. If the comparison value is the same as the mark value, the current LBA transmission unit received by the device end is a proprietary command. Therefore, the controller of the device end must extract the proprietary command from the data sector and execute the proprietary command. If the comparison value is different from the mark value, the current LBA transmission unit received by the device end is a regular data. Therefore, the controller of the device end must execute the normal data access operation.

It is worth noting that while the exemplary embodiment shows four characteristic point addresses, the present invention is not limited to that specific embodiment. The number of characteristic point addresses can be any positive integer and the computation function can be any computation equation.

In summary, the method of the present invention uses a regular data format to store the proprietary command in the data sector to pass the filtering of operating system so that he device end can receive the proprietary command. By comparing the LBA address as well as the signature values and mark value stored in characteristic point address and specific point address, the method of the present invention can determine whether the data sector stores proprietary command and then execute the proprietary command.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for protecting memory proprietary commands, applicable to a host end using a logic block area (LBA) mode to transmit a proprietary command to a device end, said proprietary command being included in an LBA transmission unit, said LBA transmission unit having a header and a data sector, said header having an LBA address and said data sector having said proprietary command, said device end having a memory and a controller, said method comprising the steps of:

Step 1: said host end selecting a specific point address and a plurality of characteristic point addresses from said data sector of said LBA transmission unit, entering step 2;

Step 2: selecting a plurality of signature values to be stored in said characteristic point addresses respectively, entering step 3;

Step 3: using a computation function to compute a mark value from said signature values, entering step 4;

Step 4: storing said mark value in said specific point address, entering step 5;

Step 5: transmitting said LBA transmission unit having said mark value and said signature values in LBA mode, entering step 6;

Step 6: said controller of said device end receiving said LBA transmission unit, entering step 7;

Step 7: extracting said LBA address from said header of said LBA transmission unit, entering step 8;

Step 8: determining whether said LBA address is within or outside a pre-defined range; if outside of said pre-define range, entering step 9; otherwise, entering step 10;

Step 9: executing said proprietary command in said data sector, entering step 16;

Step 10: extracting said characteristic point addresses from said data sector of said LBA transmission unit, entering step 11;

Step 11: performing computation function on said signature values to obtain a comparison value, entering step 12;

Step 12: extracting said mark value from said specific point address of said data sector, entering step 13;

Step 13: comparing said comparison value against said mark value; if said comparison value is different from said mark value, entering step 14; otherwise entering step 15;

Step 14: executing normal data storage operation, entering step 16;

Step 15: executing said proprietary command in said data sector, entering step 16; and Step 16: termination.

2. The method as claimed in claim 1, wherein said host end is a personal computer.

3. The method as claimed in claim 1, wherein said host end is a notebook computer.

4. The method as claimed in claim 1, wherein said host end is a personal digital assistant (PDA)

5. The method as claimed in claim 1, wherein said device end is a memory card.

6. The method as claimed in claim 1, wherein said device end is a flash memory stick.

7. The method as claimed in claim 1, wherein said pre-defined range in step 8 is greater than zero and less than or equal to a total sector number (TSN), where said TSN indicates total capacity of said memory.

8. The method as claimed in claim 1, wherein said computation function is an accumulative addition function.

* * * * *